United States Patent [19]
Mitani

[11] Patent Number: 4,823,759
[45] Date of Patent: Apr. 25, 1989

[54] PRESSURE DERIVING PORT OF INTERNAL COMBUSTION ENGINE

[75] Inventor: Tateki Mitani, Hyogo, Japan

[73] Assignee: Mitsubishi Denki Kabushiki Kaisha, Tokyo, Japan

[21] Appl. No.: 212,634

[22] Filed: Jun. 28, 1988

[30] Foreign Application Priority Data

Jun. 29, 1987 [JP] Japan ................ 62-161670

[51] Int. Cl.$^4$ ............................. F02M 25/06
[52] U.S. Cl. .................... 123/568; 123/52 M; 123/572
[58] Field of Search ........... 123/52 M, 52 MV, 568, 123/569, 570, 571, 572, 573, 574

[56] References Cited

U.S. PATENT DOCUMENTS

| | | | |
|---|---|---|---|
| 4,378,777 | 4/1983 | Iida et al. | 123/568 X |
| 4,417,548 | 11/1983 | Lindberg | 123/568 X |
| 4,517,951 | 5/1985 | Otaka et al. | 123/568 X |
| 4,648,373 | 3/1987 | Noguchi et al. | 123/568 |
| 4,672,939 | 6/1987 | Yokoi et al. | 123/568 |
| 4,693,226 | 9/1987 | Choma | 123/568 |

Primary Examiner—Willis R. Wolfe
Attorney, Agent, or Firm—Sughrue, Mion, Zinn, Macpeak & Seas

[57] ABSTRACT

A pressure deriving port of an internal combustion engine having an intake manifold in which at least one of an exhaust gas recirculating port and a blow-by gas discharge port and an opening of said pressure deriving port are formed, is opened on an upstream side of the exhaust gas recirculating port and/or blow-by gas discharge port and in a stepped-up portion of an inner wall of intake manifold.

2 Claims, 2 Drawing Sheets

PRESSURE DERIVING PORT OF INTERNAL COMBUSTION ENGINE

BACKGROUND OF THE INVENTION

The present invention relates to a structure of a pressure deriving port of an internal combustion engine, for detecting pressure of a suction system thereof.

Examples of a conventional pressure deriving port are shown in Japanese Utility Model Laid-open Nos. 138037/1982, 35646/1984 and 178630/1986 and FIG. 3 shows a suction system equipped with a pressure deriving port according to either of them. In FIG. 3, a reference numeral 1 depicts an air cleaner and 2 a throttle body connected to the air cleaner 1, which is coposed of a fuel injector 3 for injecting fuel under control of a fuel control device which is not shown and a throttle valve 4 to be controlled by an operator, etc. An intake manifold 5 is disposed between the throttle body 2 and an engine 9 and includes an exhaust gas recirculating port 6, a blow-by gas discharge port 7 and a distributor 8 for distributing a mixture of air and fuel injected by the injector 3 to respective cylinders of the engine 9.

FIG. 4 is an upsteam side view of the intake manifold 5 in which an opening 10 of the manifold 5 to be connected to the throttle body 2 and a pressure deriving port 11. A filter constituted with fine metal wires or porous resin, etc., is fitted in the pressure deriving port 11 and a rubber tube is connected to the filter for guiding pressure to a pressure sensor which may be one having a gage resister formed by semiconductor diffusion and a diaphram portion.

Air taken in through the air cleaner 1 is mixed with fuel injected by the injector 3 and a resulatant air-fuel mixture is regulated in flow rate by a degree of opening of the throttle valve and distributed through the distributor 5 to the respective cylinders of the engine 9. For purification of exhaust gas, the latter and blo-by gas of amounts predetermined by operating conditions of the engine are discharged from the exhaust gas recirculating port 6 and the blow-by gas discharge port 7 to the intake manifold 5, respectively. The pressure sensor connected through the rubber tube to the pressure deriving port 11 detects a variation of pressure in the intake manifold 5 and provides it as a voltage signal which is supplied to a microcomputer of the fuel control device to control fuel injection.

In this construction, since there are exhaust gas, blow-by gas, water content of air and fuel exist in the intake manifold 5 which are pulsated due to suction stroke of the engine and reach a sensor element of the pressure sensor through the rubber tube connecting the pressure deriving port 11 to the pressure sensor, the water content may be frozen on a surface of the tube to clog the latter or on a surface of the diaphram of the pressure sensor element to cause a pressure indication of the pressure sensor to be erroneous. Further, carbon and/or oil components may deposited on the tube surface and/or the element surface to cause their characteristics to be changed.

In order to solve such problem as mentioned above, it is usual in the conventional device to provide such filter or to make the pressure passage complicated as shown in Japanese Utility Model Laid-open No. 138037/1982. However, these solutions require an increased number of manufacturing steps as well as parts, resulting in high cost.

SUMMARY OF THE INVENTION

An object of the present invention is to provide a pressure deriving port structure of an internal combustion engine which can be manufactured economically and by which it is possible to detect manifold pressure exactly under various undesired conditions.

According to the present invention, a pressure deriving port on an internal combustion engine has an opening in an upstream side of both an exhaust gas recirculating port and a blow-gas discharge port in an intake manifold and a step is formed between an opening of the exhaust gas recirculating port and an opening of the blow-by gas discharge port so that substances contained in exhaust gas and/or blow-by gas, which may affect a pressure detection adversely, are blocked.

DETAILED DESCRIPTION OF THE PREFERRED EMBODIMENT

Figure 1:
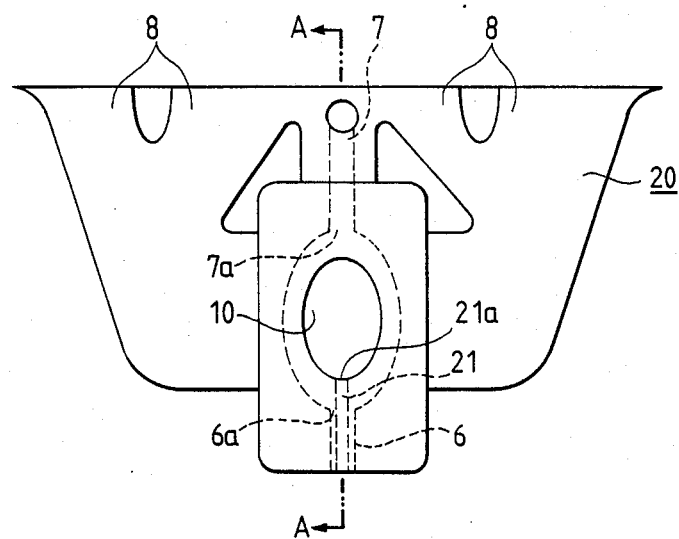
FIG. 1 is an upstream side view of a pressure deriving port according to the present invention.
Figure 2:
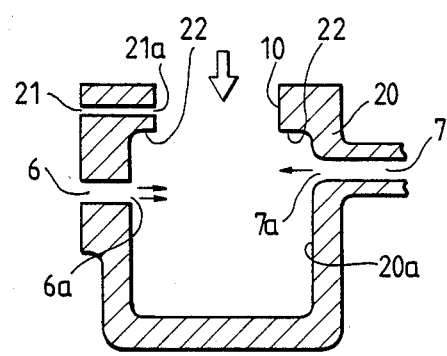
FIG. 2 is a cross section taken along a line A—A in FIG. 1.
Figure 3:
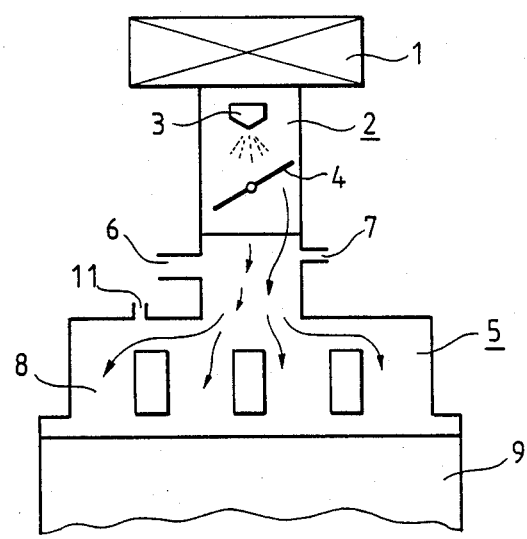
FIG. 3 is a structure of a conventional pressure deriving port.
Figure 4:
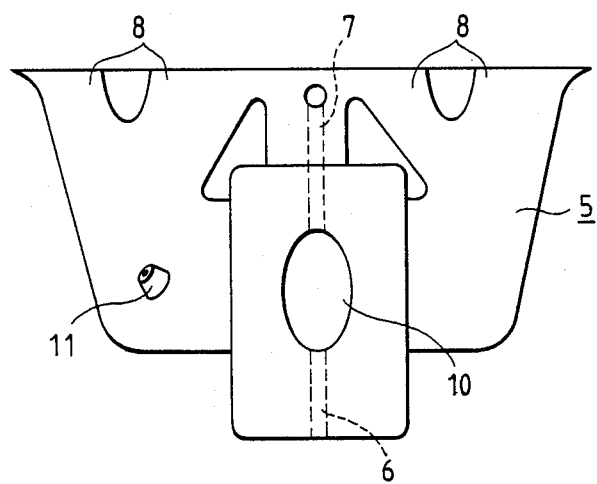
FIG. 4 is an upstream side view of the structure in FIG. 3.

In FIGS. 1 and 2, reference numerals 6 to 8 and 10 depict the same components as those shown in FIGS. 3 and 4. In FIGS. 1 and 2, an intake manifold is depicted by a reference numeral 20 in which a pressure deriving port 21 is formed. An opening 21a of the pressure deriving port 21 is positioned for an opening 6a of an exhaust gas recirculating port 6 and an opening 7a of a blow-by gas discharge port 7 of the intake manifold on an upstream side of a passage of air-fuel mixture shown by a thick arrow and a wall 20a of the intake manifold 20 is stepped to form a step portion 22 such that the opening 21a of the pressure deriving port 21 is positioned inner compared with the openings 6a and 7a of the exhaust gas recirculating port 6 and the blow-by gas discharge port 7.

In operation, the air-fuel mixture is guided through the throttle body and the opening 10 of the intake manifold 20 thereinto. At the same time, exhaust gas and blow-by gas are discharged through the openings 6a and 7a of the exhaust gas recirculating port 6 and the blow-by gas discharge port 7 to the intake manifold 20 according to an operating condition of the engine. In the intake manifold 20, these gas components are mixed and, after distributed by the distributor 8, supplied to the cylinders of the engine.

Since the opening 21a of the pressure deriving port 21 is on the upstream side of the openings 6a and 7a of the exhaust gas recirculating port 6 and th blow-by gas discharge port 7 and there is the step 22 formed, amounts of exhaust gas and blow-by gas diffused in the upstream side are very small, respectively. Particularly, as to water content which is the problem, it has been found as a result of comparing tests conducted for both the present device and the conventional device shown in FIGS. 3 and 4 that the amount of water which reaches the pressure sensing element in the present device is one fifth that of the conventional device. Further, it has been found that an amount of undesired substances such as carbon and oil in the present device is very small and negligeble for gas pressure sensing.

Although the present invention is described as to the case where both exhaust gas and blow-by gas are supplied to the intake manifold, the same effect can be obtained by arranging either of the opening 6a or 7a downstream of the opening 21a.

Further, the position of the injector is not always necessary to be on the upstream side of the pressure deriving port 21 as shown. The present invention can be also applied to other engines such as of the multipoint injector type in which injectors are provided in each porions of the distributor and of the type in which the intake manifold has a surge tank.

Further, it may be possible to use the present pressure deriving port as a pressure source for a valve etc., instead of the pressure sensor having semiconductor element.

As described, the structure of the present pressure deriving port is simple, inexpensive in manufacturing and highly reliable.

What is claimed is:

1. A structure of a pressure deriving port of an internal combustion engine having an intake manifold in which at least one of an exhaust gas recirculating port and a blow-by gas discharge port and an opening of said pressure deriving port are formed, comprising said opening of said pressure deriving port positioned on an upstream side of said at least one of said exhaust gas recirculating port and said blow-by gas discharge port and formed in a stepped-up portion of an inner wall of said intake manifold.

2. The structure as claimed in claim 1, wherein both of said exhaust gas recirculating port and said blow-by gas discharge port are formed in said intake manifold.

* * * * *